Jan. 20, 1970  J. O. EMMERSON  3,490,777
METAL SEAL CONSTRUCTION
Filed April 13, 1967  2 Sheets-Sheet 2
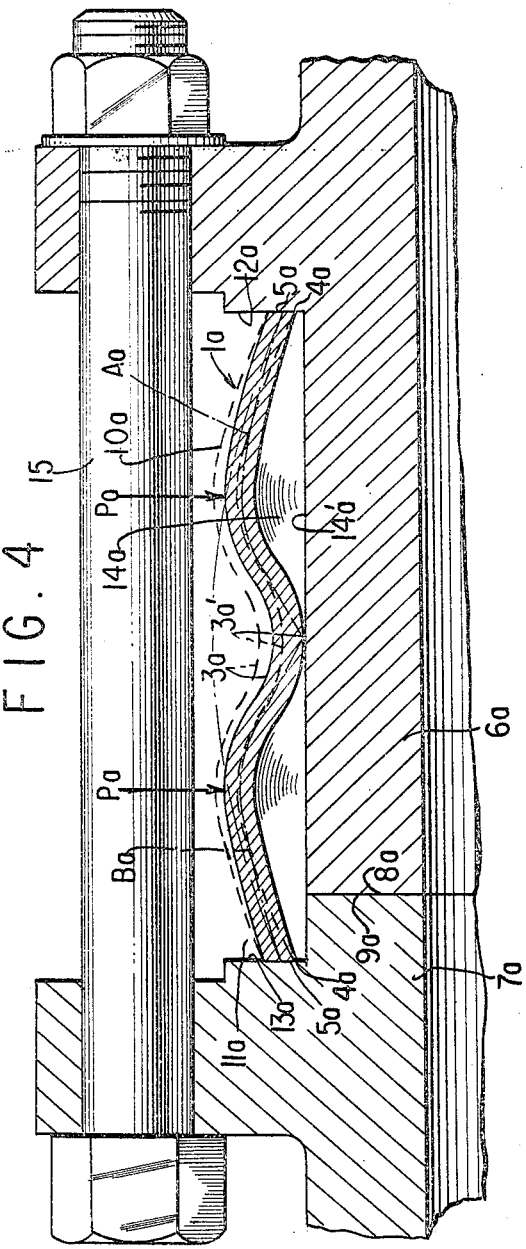
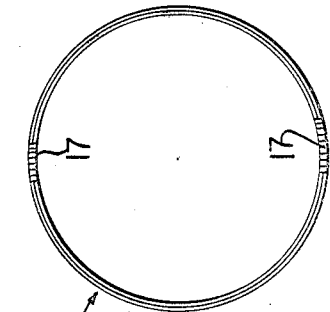
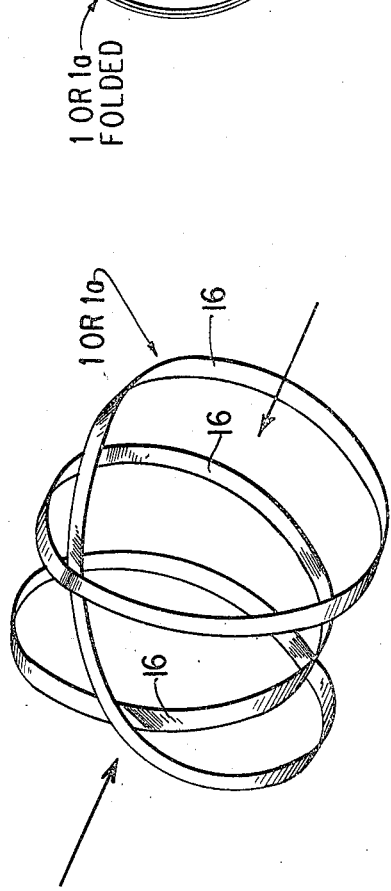
INVENTOR
JOHN O. EMMERSON
BY
ATTORNEYS

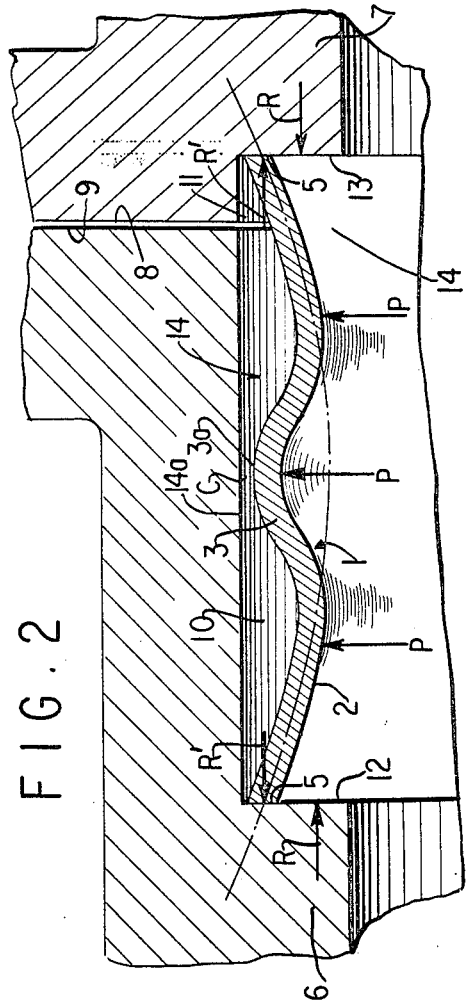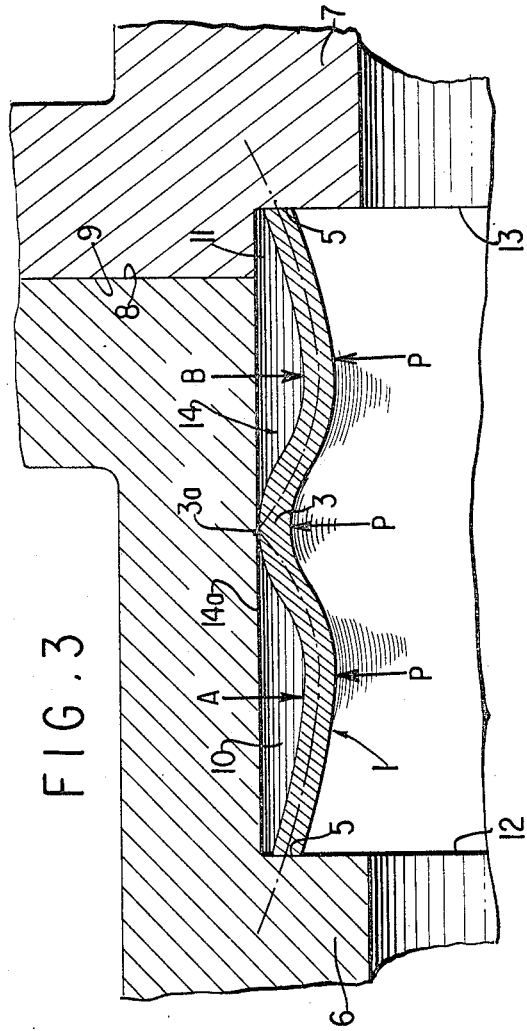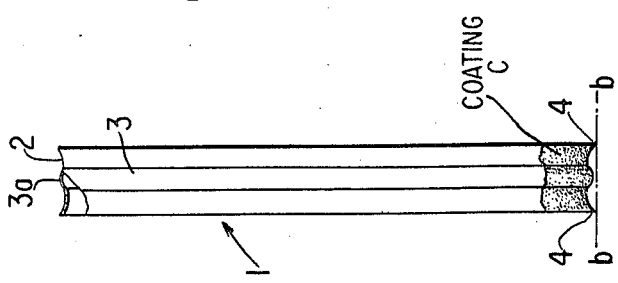

United States Patent Office 3,490,777
Patented Jan. 20, 1970

3,490,777
METAL SEAL CONSTRUCTION
John O. Emmerson, Hamden, Conn.
(Bradley Park, East Granby, Conn. 06026)
Filed Apr. 13, 1967, Ser. No. 630,589
Int. Cl. F16j 15/08, 15/02
U.S. Cl. 277—206          5 Claims

ABSTRACT OF THE DISCLOSURE

A sealing member for effecting seals under high pressure at the joint between joinable members in the form of a ring of sheet metal having an arched peripheral surface provided with a reversely disposed convolution of less height than the maximum depth of the arched surface, the ring preferably being covered with a low compressive yield strength coating and having sealing edge surfaces engageable with spaced-apart walls defining a groove in the joined members, the sealing effect of which becomes enhanced by pressure directed against the ring generated by pressure because the geometric configuration of the arched surface (low height width ratio) causes the contained loads to be amplified (or "servoed") in creating the sealing reaction loads.

Brief summary of invention

The invention relates to a high quality precision seal possessing a high degree of elastic resiliency (i.e. its ability to return to unloaded shape upon withdrawal from a sealing groove) and dynamic resiliency (i.e. its capability of increasing its sealing dimensions to follow the load flanges under motivation of the contained pressure) and having a geometrical configuration such that the sealed presusre augments the natural elastic resistance of the seal so as to increase the unit pressures at the sealing interfaces.

A number of seals attempting to provide these features have been recently presented because of the increased need for such devices, but a common objectionable factor of these seals is high cost as compared to earlier seals such as metal O-rings.

In the known structures, the load generated at the sealing surface is generally equal pound for pound to the load acting internally on the seal structure but none provide a metal seal in which there is a multiplication of the energizing load at the sealing interface.

A primary design requirement of a metal seal is that it must either withstand the full hoop tension load induced by the contained pressure, or deflect to allow the surrounding structure to reinforce its hoop strength capability. In known metallic seals, substantial pieces of metal are incorporated in the seal structure to handle the hoop tension loads.

Objects and features of this invention are the provision of metal seal structure capable of meeting these design requirements without, however, requiring the inclusion of added metallic pieces and which are effective and easy to manufacture at relatively low cost.

The design features of the novel metallic seal embodying the invention utilize principles of the Roman arch which is so shaped that with load application, the loads are transmitted to the reaction points in substantially pure compression without bending, such arch affording great strength with even a thin sheet metal section, but also capable of generating high interface loads with comparatively low contained pressure.

A single Roman arch, however, fails at very high pressure because of its collapse through compression buckling, but this failure instability is remedied in the present invention by the provision of a reversely extending annular convolution located at the center of the arch. While such a convolution compromises the strength of the primary arch in its initial deflection, it has been found that strength and stiffness of the seal increases by a large factor when the arch elastically deforms under changing presusre so as to allow the convolution to bottom and become supported by the surrounding seal groove. When this deflection occurs, the seal in effect "changes gears" and becomes two separate and distinct Roman arches, each capable of supporting a much higher pressure than the single and larger Roman arch that would exist without such convolution. Thus, the seal with Roman arch configuration, including the aforesaid center convolution provides for "dual range" operation, thus resulting in an effective metal seal that is fully operative under a wide range of load conditions.

The sealing ring embodying this invention is useful both in effecting seals of contained pressures and containment of external pressures.

The invention also contemplates sealing rings of the type in question of large diameters that may be folded into small compass for shipment without damage and which may be readily unfolded in situ for use.

Other objects and features of the invention will become apparent from the following detailed description and the accompanying drawings, wherein:

FIGURE 1 is a side elevation of a metal seal embodying the invention for confining internal pressures;

FIGURE 2 is a fragmentary transverse section on an enlarged scale illustrating the condition of the seal in position between flanges showing the arch under nominal confined pressure loads;

FIGURE 3 illustrates the same section under high internal pressure conditions while functioning as a seal;

FIGURE 4 is a fragmentary transverse section illustrating use of a sealing ring embodying the invention to contain external pressures;

FIGURE 5 is a perspective view illustrating a manner of folding a large diametered sealing ring embodying the invention into small compass for shipment, and FIGURE 6 illustrates the folded ring of FIGURE 5 in its shipping condition.

Detailed description

Referring to the drawings and first to FIGURE 1, the seal of this invention for confining internal pressures comprises a ring 1 of thin sheet metal resistant to (chemical) attack by the composition of the material under pressure that is to be confined, being, for example, of stainless sheet steel provided with an overall coating of, for example, "Teflon" or plated coating to flow into minute crevasses that might otherwise constitute leakage paths, being, for example, precious soft metals or the like material.

This ring 1 has its peripheral surface bowed inwardly at 2 to provide curvature of general Roman arch configuration which, however, is provided with a reverse outwardly extending centrally located annular convolution 3 whose height at its crest 3a is somewhat less than the maximum depth of the inwardly extending Roman arch curve so that its crest 3a lies below a line b—b spanning the peripheral edge extremities 4 of the ring 1. These extremities 4 in turn, preferably are precisely machined to provide wall faces 5 that extend substantially vertically for purposes presently to be described.

Use of the ring 1 as described as a seal contemplates provision of a pair of joinable tubular members 6 and 7 having male and female flanges with abuttable end faces 8 and 9 that may be joined and clamped together under pressure in conventional ways and provided internally respectively with annular aligned end recesses 10 and 11 with respective vertical oppositely located end walls 12 and 13 so that in assembly the aligned end recesses define an internal annular groove 14 into which the ring 1 is fitted with its opposite wall faces 5 abutting the respective walls 12 and 13 and compressed tightly in sealing engagement therewith when the faces 8 and 9 of the tubular members 6 and 7 are clamped and tightened together, the tightening forces R then providing effective seals between walls 12 and 13 and peripheral ring surfaces 5. Then, under normal circumstances the confined internal pressures P directed radially outwardly against the inner surface of ring 1 are converted into axially and amplified directed pressures tending to bow the ring 1 outwardly and providing forces R' in axial direction in opposition to the tightening forces R and tending thus to increase the effectiveness of the seal while leaving a clearance C between the outer crest $3a$ of the convolution 3 and the bottom wall $14a$ of groove 14.

Any increases in confined internal pressures P increases the outward flexures of the ring 1 to the limit permitted by movement of its convolution crest $3a$ through the clearance C into engagement or bottoming with the bottom wall $14a$ of groove 14 as seen in FIGURE 3, simultaneously increasing longitudinal sealing pressure between the peripheral ring surfaces 5 and walls 12 and 13. Subsequent to bottoming of the crest $3a$ against bottom wall $14a$, the ring 1 in effect "changes gears," i.e., it becomes two contiguous arches A and B respectively extending between wall 12 and the crest $3a$ and the latter and wall 13. Thus, any further increase of confined pressures P act further and dually upon the two arches of ring providing dual increases in longitudinal sealing pressures exerted by ring edges 5 on respective walls 12 and 13. Thus, the arcuate configuration with reverse convolution 3 in the ring 1 provides for effective sealing acting as a single arch at low and intermediate confined pressures whose strength becomes enhanced by the double arch as internal confined pressures increases which occurs when the crest $3a$ bottoms against wall $14a$ of the groove 14.

The ring 1 hereinabove described is used particularly to provide a seal for confining of internal pressures. A similar type of ring $1a$ useful for reverse type sealing, e.g., of a vacuum within a coupled joint is illustrated in FIGURE 4. Therein, the ring $1a$ of the same material as ring 1 optionally provided with a similar type of coating $1a$ has its peripheral surface bowed outwardly at $2a$ to provide convex curvature of general Roman arch configuration which, however, is provided with a reversely inwardly extending centrally located annular convolution $3a$ whose height at its crest $3a^1$ is normally somewhat less than the maximum height of the outwardly extending Roman arch so that its crest $3a^1$ ordinarily lies above a line spanning the peripheral edge extremities $4a$ of the ring $1a$. These extremities $4a$ in turn, are preferably precisely machined to provide wall faces $5a$ that extend substantially vertically.

Use of the ring $1a$ as described as a seal contemplates provision of a pair of joinable tubular members $6a$ and $7a$ having male and female flanges with abuttable end faces $8a$ and $9a$ that may be joined and clamped together under pressure in conventional ways as by clamping bolts 15 and provided externally respectively with annular aligned end recesses $10a$ and $11a$ with respective vertical oppositely located end walls $12a$ and $13a$ so that in assembly the aligned end recesses define an annular external groove $14a$ into which the ring $1a$ is fitted with its opposite wall faces $5a$ abutting the respective walls $12a$ and $13a$ and compressed tightly in sealing engagement therewith when the faces $8a$ and $9a$ are clamped and tightened together, the tightening forces then providing effective seals between walls 12 and 13 and peripheral ring surfaces $5a$. Then under normal circumstances, the pressures Pa directed radially inwardly against the outer surface of ring $1a$ are converted into axially and amplified directed pressures tending to bow ring $1a$ inwardly and providing forces in axial direction in opposition to the tightening forces and tending thus to increase the effectiveness of the seal while normally leaving a small clearance between the inner crest $3a^1$ of the convolution $3a$ and the bottom wall $14a'$ of groove $14a$.

Any increase in the external pressure increases the inward flexure of ring $1a$ to the limit permitted by the movement of its convolution crest $3a$ through the clearance into bottoming contact with wall $14a'$ of groove $14a$ as seen in FIGURE 4, simultaneously increasing longitudinal sealing pressure between the peripheral ring surfaces $5a$ and walls $12a$ and $13a$. Subsequent to the bottoming of crest $3a'$ the ring $1a$ becomes in effect two contiguous arches $A_a$ and $B_a$ respectively extending between wall $12a$ and the crest $3a'$ and the latter and wall $13a$. Thus, the arcuate configuration with reverse convolution $3a$ in the ring $1a$ provides for effective sealing action as a single arch at intermediate confined pressures which becomes strengthened as the confined pressure decreases and the crest $3a'$ bottoms.

Thus, the rings 1 or $1a$ with respective inwardly or outwardly arranged Roman arch configuration are useful respectively for effective sealing of confined pressures or of low internal pressures or vacuum conditions in containers.

The structures of rings 1 and $1a$ as described are useful not only in effecting seals between small diametered joints but also for very large diametered joints ranging up to 20 to 25 feet in diameter, for example, in the sealing of nuclear vessels for commercial power generators, as a replacement for large diameter tubing metal O-rings. These O-rings are used generally in concentric pairs and when of the order of 25 foot diameter present a shipping problem of great magnitude often requiring special aircraft or barges for delivery to sites of use and consequent enormous delivery costs. The flexible nature of the rings 1 or $1a$ of this invention overcomes these difficulties because their cross section enables them to be folded into loops to small compass for shipment without any distress to their metal structures. Thus, as seen in FIGURE 5, such large diametered rings 1 or $1a$ may be folded in the manner of metal band saw blades into an odd-numbered plurality of small diameter loops 16 which for shipment may be temporarily bound together by appropriately applied binding tapes 17, FIGURE 6, into small compass for shipment. At the sites of use, the tapes 17 are removed and the loops unfolded to permit the unfolded and undamaged ring to be mounted for sealing purposes as has been described.

It is, of course, possible to provide a recess in one flange only of one of the abutted tubular members, which recess is of sufficient width to receive the entire ring and have the other flange present merely a plane surface to define the annular groove wherein a ring is positioned.

What is claimed is:

1. In combination with a pair of joinable members having axially aligned recesses defining an annular groove when said members are joined, said groove having a bottom wall and parallel substantially plane spaced-apart side walls perpendicular to the bottom wall, a sealing member within said groove for effecting seals under high pressure, said sealing member comprising a flexible sheet metal ring said ring having a peripheral arched surface of less depth than said groove and also provided with a reversely disposed convolution in said arched surface having a crest whose height is less than the major depth of curvature of the arched surface with clearance between said crest and the bottom wall of said groove, said ring having outer side edges that are substantially plane surfaces which extend substantially perpendicular to the axis of said ring and abut the respective parallel side walls of said groove, said ring being subject to flexing as a single arch under pressure from the convex side of the ring to the limit permitted by engagement of the crest with said bottom wall to then cause exertion of increased sealing pressure between the abutting plane surfaces of the said edges and said side walls, and also being subject to additional flexing upon further increase of pressure on the convex side of said ring as double contiguous arches then defined between ring edges and the engaged crest to thereby provide additional increase of sealing pressure between the plane surfaces of the ring and those of the parallel side walls against which they abut.

2. A sealing member for effecting seals under high pressure, insertable into an annular groove defined between a pair of joinable members, the groove having a bottom wall and parallel side walls, said sealing member comprising a flexible sheet metal ring whose peripheral surface is arched and also provided with an annular reversely disposed convolution in said surface, having a crest whose height is less than the major depth of curvature of the arched surface, said ring having outer edges that are substantially plane surfaces which extend substantially perpendicular to the axis of said ring and abut the respective parallel side walls of said groove, said ring being subject to flexing as a single arch under pressure on its convex face to the limit permitted by engagement of the crest with said bottom wall to cause exertion of increased sealing pressure between the abutting plane surfaces of said edges and of said parallel side walls of said groove, and being thereafter subject to additional flexing upon further increase of pressure on said convex side as double contiguous arches then defined by its edges and the engaged crest to provide additional increase of sealing pressure between the plane surfaces of the ring and those of the parallel side walls of said groove against which they abut.

3. A sealing member according to claim 2, including a coating on the surfaces of said ring.

4. A sealing member according to claim 2 wherein said ring is of large diameter folded into a plurality of smaller diametered loops and temporary binding means for said loops.

5. In the combination of claim 1, said sealing member including a coating on the surface of said ring.

References Cited

UNITED STATES PATENTS

| | | | |
|---|---|---|---|
| 2,969,998 | 1/1961 | Rodaway | 277—206 |
| 3,240,501 | 3/1966 | Smith | 277—236 X |

FOREIGN PATENTS

| | | |
|---|---|---|
| 911,682 | 3/1946 | France. |

LAVERNE D. GEIGER, Primary Examiner

JEFFREY S. MEDNICK, Assistant Examiner

U.S. Cl. X.R.

277—235, 236; 285—95, 336